| United States Patent [19] | [11] | 4,279,799 |
|---|---|---|
| MacGregor et al. | [45] | Jul. 21, 1981 |

[54] LOADED POLYURETHANE ARTICLES

[75] Inventors: Cline J. MacGregor, Lancaster; Roy A. Parker, Athens, both of Ohio

[73] Assignee: The Goodyear Tire & Rubber Company, Akron, Ohio

[21] Appl. No.: 89,820

[22] Filed: Oct. 31, 1979

[51] Int. Cl.³ .............................................. C08L 75/04
[52] U.S. Cl. .................................................. 260/37 N
[58] Field of Search ..................................... 260/37 N

[56] References Cited

U.S. PATENT DOCUMENTS

| 3,824,201 | 7/1974 | McGranaghan et al. ......... 260/37 N |
| 3,933,728 | 1/1976 | Henbest ............................. 260/37 N |

*Primary Examiner*—Lewis T. Jacobs
*Attorney, Agent, or Firm*—J. D. Wolfe; J. P. Ward

[57] ABSTRACT

Polyurethane compositions containing milled glass fibers alone tend to have anisotropic properties. This effect is cured by adding an effective amount of mica, preferably about 22 to 25 percent for each 5 to 8 percent of milled glass fiber.

4 Claims, No Drawings

LOADED POLYURETHANE ARTICLES

TECHNICAL FIELD

This invention relates to production of milled fiberglass polyurethane shaped products that have properties more nearly the same in the directions opposite to the directions of flow. More particularly this invention relates to a polyurethane containing both milled fiberglass and mica.

BACKGROUND ART

It has been known to add glass fibers to polyurethane coating to improve the physical properties. Unfortunately the resulting moldings tend to exhibit anisotropic behavior.

DISCLOSURE OF THE INVENTION

We have discovered that a polyurethane article containing both milled fiberglass and an effective amount of mica does not exhibit the anisotropic behavior to the extent found in polyurethane articles containing the same amount of milled fiberglass alone. Thus the extreme warpage experienced with milled fiberglass polyurethane moldings can be reduced by inclusion of mica in the molding recipe to a degree to permit parts for automobiles to be molded which require relatively close tolerances.

BEST MODE FOR CARRYING OUT THE INVENTION

To achieve the more favorable reduction in warpage, more desirable mechanical properties and best processability it is preferred to use 22 to 25 percent of mica and 5 to 8 percent milled fiberglass on a weight basis of polyurethane. These ratios of mica, milled fiberglass and polyurethane give the better flexural modulus with reduced to minimum anistropic behavior of the molding.

Both mica and milled fiberglass can be used in any of the well known molding or casting polyurethane recipes. Generally it is desirable to keep the viscosity of the mixture as low as possible to facilitate pouring, pumping, etc. in the making of moldings.

The casting or molding recipes for polyurethanes broadly can be characterized as a mixture of a polyol, preferably of a polyether polyol or a polyester polyol of 500 to 7000 molecular weight having 2 to 4 hydroxyls with an organic polyisocyanate such as the preferred methane di(phenylisocyanate). Preferably an isocyanate index of about 0.95 to 1.15 is used. It should be appreciated that a small amount of blowing agent, such as du Pont's trademark Freons, or water, can be used to advantage where porous castings are desired.

Chopped glass strands are available in a variety of lengths. The maximum length is dictated by the orifice opening in the impingement head of the urethane mixing apparatus. The smallest available is 8.5 mils of chopped thread. Chopped fiberglass reinforced urethane compounds exhibit rapid viscosity buildup as the chopped strands are added either to a urethane polyol or isocyanate stream or the resultant mixture. Hence viscosity buildup is a limiting factor on the amount of glass fiber that can be used. Milled fiberglass is available in a variety of lengths. They are continuous glass filaments (½ mil diameter) that have been hammer milled to a size that passes through a screen having the following average size, 4, 5, 7, 8.5 and 13 mils. Preferably the glass is treated with an organosilane sizing to make it more compatible with polyurethanes. This sizing may affect the physical properties of the polymers.

Mica is available as various mineral forms, usually about nine types. It can be ground to different sizes by well known means. It is preferred to select one having low absorbed water. Suzorite contains about 4.0 percent water which may be driven off by drying in an oven.

The commercial Suzorite 200S is preferred because its surface quality is better with smaller mica sizes. The aspect ratio of mica can vary from about 25 to 40.

The viscosity increase is not as great as with the fiberglass since the viscosity is non-Newtonian. Also the viscosity is lower at higher shear rates.

Milled fiberglass polyurethane moldings were prepared using a Cincinnati-Milacron UM-G machine. The polyol used in resin pot was a blend on a weight basis of 70 parts of a 20 percent by weight styrene/acrylonitrile graft polypropylene ether triol and 30 parts by weight of a blend of a 50 weight percent phenyl diethanolamine and 50 weight percent ethylene glycol, 0.08 part of a tin catalyst, of stannous octoate or dibutyl tin dilaurate type and 2.0 parts of a chlorotrifluoro ethane.

The isocyanate pot was charged with Mondur PF, a trade name product of Mobay Chemical Company, and reported to be a quasi-prepolymer of methane di(-phenylisocyanate) and tripropylene glycol. The chopped strands of fiberglass and mica was added all to the resin pot or all to the isocyanate pot or divided between the pots and kept in suspension by stirring. A series of castings were made at isocyanate index of from 0.95 to 1.10 with and without glass and/or micas. The cured polyurethane castings containing both glass and mica showed a reduced tendency to exhibit anistropic properties relative to ones produced containing glass alone.

While certain representative embodiments and details have been shown for the purpose of illustrating the invention, it will be apparent to those skilled in this art that various changes and modifications may be made therein without departing from the spirit or scope of the invention.

We claim:

1. A polyurethane composition containing a sufficient amount of milled glass fibers to exhibit ansitropic properties, said ansitropic properties being reduced by the presence of an effective amount of mica.

2. The composition of claim 1 wherein the milled glass fibers have an average size of from about 4.5 to 13 mils.

3. The composition of claim 1 wherein the composition contains 10 to 30 weight percent of mica and 5 to 25 weight percent of milled glass fibers.

4. The composition of claim 2 wherein the amount of mica is 22 to 25 percent by weight and the amount of milled glass fibers is 5 to 8 percent by weight.

* * * * *